United States Patent [19]
Haase et al.

[11] 3,904,465
[45] Sept. 9, 1975

[54] PROCESS AND APPARATUS FOR THE MANUFACTURE OF EMBOSSED FILM LAMINATIONS

[75] Inventors: Donald A. Haase, Penfield; Robert E. Reed, Canandaigua, both of N.Y.

[73] Assignee: Mobil Oil Corporation, New York, N.Y.

[22] Filed: Sept. 21, 1972

[21] Appl. No.: 291,118

Related U.S. Application Data

[60] Division of Ser. No. 13,171, Feb. 20, 1970, abandoned, which is a continuation of Ser. No. 580,302, Sept. 19, 1966, abandoned.

[52] U.S. Cl. .................. 156/199; 93/1 F; 93/13; 93/35 PC; 156/197; 156/200; 156/203; 156/204; 156/209; 156/219; 156/272; 156/282; 156/290; 156/292; 428/124; 428/126; 428/157; 428/163; 428/166; 428/178; 428/179; 428/188; 428/194; 428/195; 229/53; 229/55

[51] Int. Cl.² .................. B32B 31/18; B32B 31/20; B65D 33/02; B65D 37/00

[58] Field of Search .......... 161/118, 121, 123, 139, 161/116, 122, 130; 229/53, 55; 156/145, 156/146, 196, 197, 199, 209, 272, 282, 292, 156/290; 93/1 F, 13, 35 PC

[56] References Cited
UNITED STATES PATENTS

| | | | |
|---|---|---|---|
| 2,633,442 | 3/1953 | Caldwell | 156/197 |
| 2,660,757 | 12/1953 | Smith et al. | 161/130 |
| 2,739,093 | 3/1956 | Bull | 156/292 |
| 2,917,223 | 12/1959 | Le Bolt et al. | 229/53 |
| 3,068,935 | 12/1962 | Grenci | 156/498 |
| 3,081,571 | 3/1963 | Dayen et al. | 156/272 |
| 3,126,580 | 3/1964 | Paschke | 425/388 |
| 3,130,647 | 4/1964 | Anderson et al. | 93/35 P C |
| 3,142,599 | 7/1964 | Chavannes | 156/292 |
| 3,283,992 | 11/1966 | Hanson et al. | 229/53 |
| 3,411,698 | 11/1968 | Reynolds | 229/53 |
| 3,466,212 | 9/1969 | Clayton et al. | 156/272 |

*Primary Examiner*—George F. Lesmes
*Assistant Examiner*—J. Cannon
*Attorney, Agent, or Firm*—Charles A. Huggett; James D. Tierney

[57] ABSTRACT

A method for the production of embossed laminar thermoplastic film structures comprising supplying a first length of a thermoplastic film onto the surface of a patterned roller, portions of which pattern are capable of absorbing infrared radiation, subsequently heating the patterned surface to raise the temperature of the film in those areas which are in contact with the infrared absorbent pattern, and finally superimposing a preheated film onto the film on the surface of the patterned roller to produce a laminar structure bonded together along a plurality of intersecting heat seal lines.

5 Claims, 12 Drawing Figures

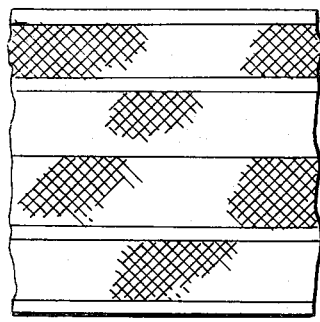
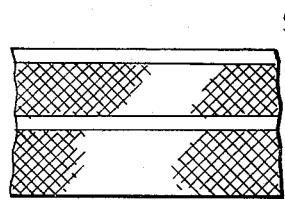
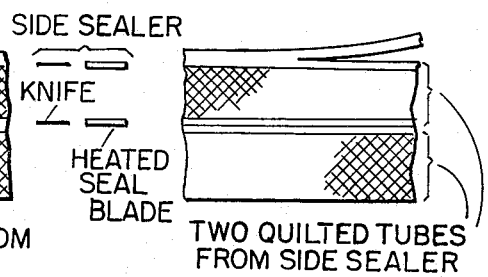
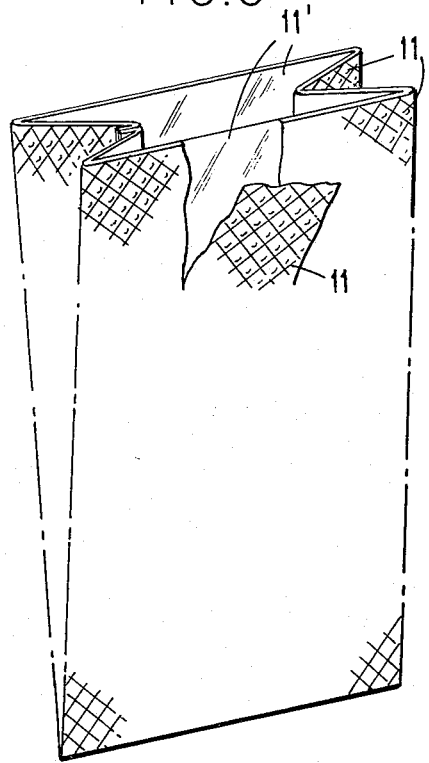
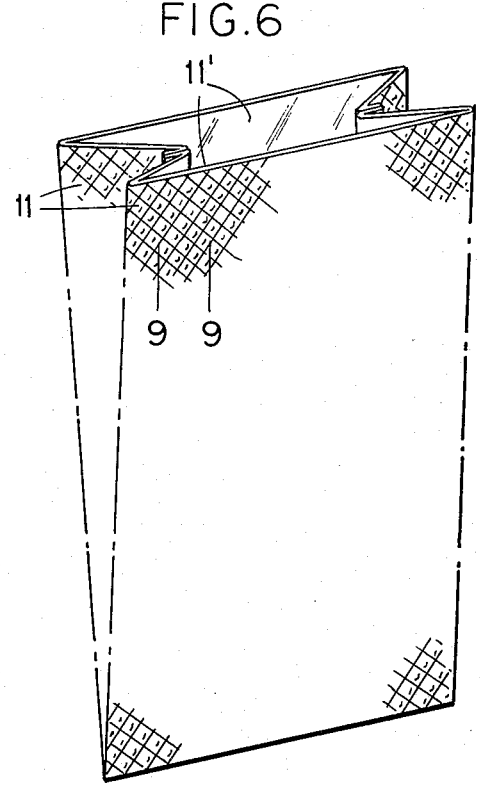
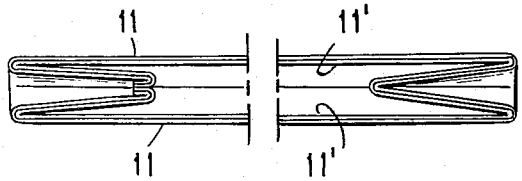
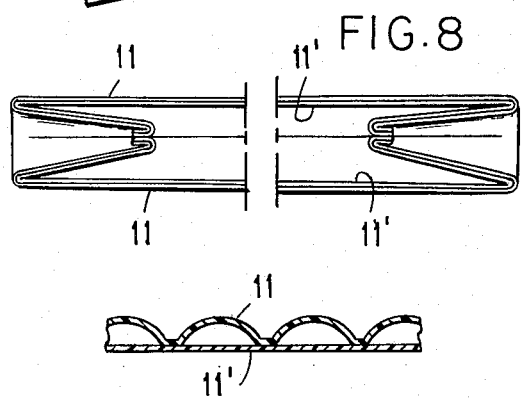

PROCESS AND APPARATUS FOR THE MANUFACTURE OF EMBOSSED FILM LAMINATIONS

CROSS-REFERENCE TO RELATED APPLICATIONS

The present application is a division of application Ser. No. 13,171, filed Feb. 20, 1970, and now abandoned which is a continuation of U.S. Pat. Application Ser. No. 580,302, filed Sept. 19, 1966, now abandoned.

The present invention relates to embossed thermoplastic films, laminations of embossed thermoplastic films and, more particularly, to methods for manufacturing such film products.

In certain techniques disclosed in the prior art, embossments have been formed upon the surface of single or multiple layers of film products by employing embossing rolls, or the like, which serve to mechanically impress a desired pattern upon the surface of a film by a physical permanent distortion of the film surface. Heat is sometimes employed in such embossing operations to soften the plastic material thereby facilitating the impression of a desired pattern into the surface of a film and also insuring, to a degree, a permanent type embossment of the film surface.

It is also known in the pior art to form embossed laminar products. This may be accomplished by well known vacuum forming techniques whereby a single layer of film is subjected to vacuum application in selected areas, resulting in a plurality of concave distentions of the film surface, and, subsequently, a smooth film is applied to one or both sides of such a vacuum embossed film to form an embossed, laminar structure. Generally, such a procedure is time consuming, the vacuum being applied to the base sheet of film in successive, incremental, stages and the lamination procedure likewise requiring separate processing steps.

In accordance with the teachings of the present invention, film may be formed into embossed structures and embossed, laminar, structures utilizing an extremely simple and efficient processing technique.

Additionally, the process of the present invention may be employed to produce embossed, laminar, products which have air bubbles encapsulated therein, in a predetermined, patterned configuration.

For a more complete understanding of the process of the present invention, reference may be had to the accompanying drawings wherein:

FIGS. 4, 4A and 4B illustrate schematically a part of a sequential bag making operation utilizing the laminar embossed film material of the present invention.

FIGS. 5 and 6 are perspective views of bag structures manufactured in accord with the process of the present invention.

FIGS. 7 and 8 are top plan views of the bag structures illustrated in FIGS. 5 and 6 respectively.

FIG. 9 is a cross-sectional view of a laminar embossed film structure of the present invention taken on line 9—9 of FIG. 6.

In general, the process of the present invention relates to a method for the production of an embossed, laminar thermoplastic film which comprises advancing a length of thermoplastic film onto a raised, patterned surface of a moving support, advancing said surface at the same rate as said film, impressing said film against the surface of said moving support by nipping said film between said support and a counter-rotating, resilient-surfaced roller, transmitting radiant heat energy to the raised, patterned surface of said moving support supporting said film, advancing a second length of preheated film into superposed relationship with the film layer impressed upon the raised patterned surface of said moving support by the action of a second counter-rotating roller in nipping engagement with the raised patterned surface of said moving support, and thereafter, withdrawing the resulting embossed, laminar, thermoplastic film from said support.

In the practice of the present invention, use is made of a raised embossing and sealing pattern 17, of substantial height and, for example, of a height sufficient to provide on the film surface a difference in elevation larger than is provided by normal printing or coating of such a surface. Generally speaking, in the practice of the present invention the raised pattern 15 is at least 4 mils in height and more preferably from about 10 to about 1,000 mils.

Figure 1:
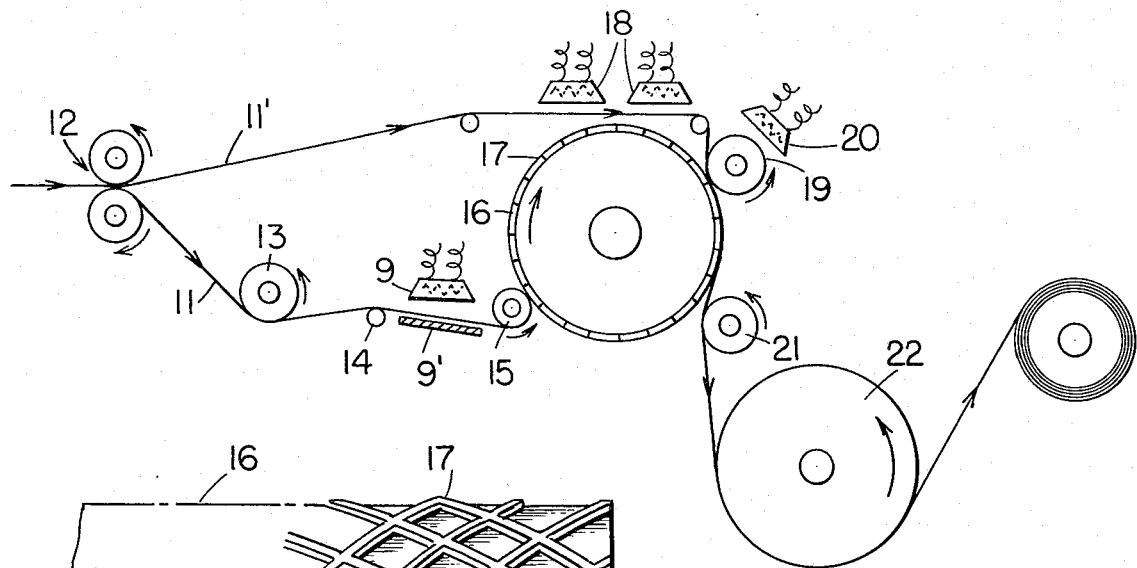
FIG. 1 is a side view in elevation, largely diagramatic, of an apparatus suitable for practice of the process of the present invention.

As illustrated in FIG. 1, film layers 11 and 11' are fed through idler nip 12. The film layers fed to nip 12 may be supplied from films supply rollers not illustrated or they may be supplied from an in-line extrusion operation where a tube of thermoplastic material is extruded, inflated, and cooled utilizing standard techniques, subsequently flattened and slit along opposed lateral edges thereby forming 2 layers of film as the feed stock for idler nip 12. As the film layers emerge from nip 12, the lower film layer 11 passes under idler roll 13 and over the top of spreader bar 14 which insures that film layer 11 remains in a substantially wrinkle-free condition. After passing over spreader bar 14 it passes beneath a source of radiant energy 9 such as, for example, an infrared-emitting quartz type lamp. Beneath the film at this point is located metallic plate 9' which is heated by radiant heat source 9. This results in film layer 11, intermediate radiant heat source 9 and heated plate 9', being heated as a result of heat radiation from heated plate 9'. This heat is used to warm the lower layer of film just enough to let it stretch slightly so that equal tension can be maintained on the upper layer of film 11' which must travel a greater distance than lower film layer 11. Subsequently, heated film layer 11 passes beneath quilt roll 15 and up into the nip formed between quilt roll 15 and counter-rotating cylinder 16. Quilt roll 15 is a roller such as a metallic roller, which has been covered with a continuous layer of resilient material, for example, silicone sponge. Quilt roll 15 functions to mechanically stretch the film layer 11 into cavities which are present on the embossed surface of cylinder 16. Cylinder 16 is a metallic drum which may be internally cooled to regulate the temperature thereof as more clearly illustrated in FIG. 3a. Annular grooves are recessed into the periphery of cylinder 16 for the reception of a embossed pattern 17 hereinafter referred to as the mask. Mask 17 is fabricated from a thermal insulating material which is a good absorbent of infrared radiation such as, for example, natural or artificial rubber, epoxy resin materials or coated paper. Mask 17 is secured, e.g. by means of an adhesive, to the surface of cylinder 16.

Figure 2:
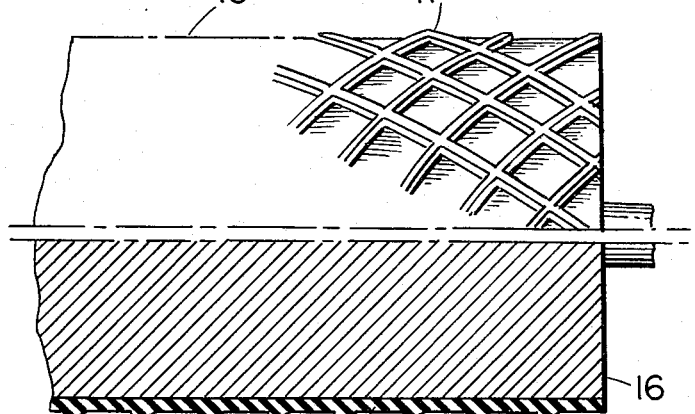
FIG. 2 is an elevational view on an enlarged scale, partly in section, of a type of patterned surface cylinder which may be employed in the process of the present invention.

As illustrated in FIG. 2, mask 17 comprises a continuous sleeve, the outer surface of which carries a raised embossing pattern. The pattern may assume any configuration and in the case of the design illustrated in FIG. 2, the pattern consists of a series of intersecting lines in the form of diamonds with intermitent cavities. The function of the cavities as hereinafter described is to receive the distended portions of film layer 11. As quilt roll 15 impresses film layer 11 against the mask 17, carried upon the face of cylinder 16, those portions of film 11 not in contact with raised portions of mask 17, since they are somewhat pliable, are distended and forced to assume a slightly concave configuration in the cavities intermediate the raised intersecting lines on the surface of mask 17. As the film is rotated past the nip formed by quilt roll 15 and cylinder 16, the plurality of concave configurations impressed upon the film surface by quilt roll 15 remain.

As mask 17, adhesively secured to the surface of rotating cylinder 16 rotates, it is exposed to a source of radiant heat energy 18 which may comprise, for example, one or more infrared emitting quartz lamps. Since clear, thermoplastic film layer 11' is substantially transparent to the transmission of infrared heated radiation, the heat from radiant heat source 18 serves to continually heat the surface of mask 17. As a result, film layer 11 after it is impressed upon the surface of mask 17 by quilt roll 15, is heated almost to the melting point where it is in contact with the raised intersecting lines on the surface of mask 17. The intermediate areas of film, i.e. those areas which are distended into the cavities intermediate the intersecting lines on mask 15, are also heated but to a lesser extent because they are not in touching contact with the mask. As film layer 11 passes through the nip formed by quilt roll 15 and the mask 17, it passes upwardly beneath radiant heat source 18. During this passage, the portions of film intermediate the raised intersecting lines on mask 17 are heated sufficiently so the the deformation into the cavity of these film portions become permanent. As illustrated in FIG. 1, rotating cylinder 16 continues to carry film layer 11 pass radiant heat source 18 and into nipping engagement with film layer 11' and seal roll 19. Seal roller 19 is preferably a coated roller, coated with, for example, Teflon, silicone rubber, or silicone sponge rubber, and which is heated by radiant heat source 20. As film layer 11 and 11' emerge from the nip formed by seal roll and rotating cylinder 16, the layers are sealed together in those areas corresponding to the raised intersecting lines carried on the surface of mask 17. The sealing together of film layers 11 and 11' is accomplished by heating to a fusion temperature those areas of film layer 11 supported by the intersecting raised sealed lines carried on the surface of mask 17 with infrared radiation. Heated seal roll 19, which presses the film layers together, preheats film layer 11' to an elevated temperature whereby when it is pressed against layer 11 by roll 19 it is fused thereto in those areas where it contacts layer 11, vis. on the raised intersecting seal lines. The fusion is brought about by the heat softening of lower layer of film 11 at the seal lines and the heat and pressure applied to the film layers as they pass through the nip formed by rotating cylinder 16 and seal roll 19. The product, as more clearly illustrated in FIGS. 5 and 9, comprises two layers of film bonded together along intersecting lines corresponding to the raised intersecting portions of mask 17, one of said film layers being substantially flat (i.e. film layer 11') and the other layer 11 which was in direct contact with mask 17 comprises a patterned series of raised bubbles, with air encapsulated therein, the pattern of said bubbles on the surface of said film layer 11 corresponding to the positions of the cavities carried in the surface of mask 17. The amount of air entrapped or encapsulated in these film bubbles and correspondingly the size or height of said bubbles may vary and in the process of the present invention is generally dependent upon the depth of the cavities intermediate the intersecting lines of mask 17.

Figure 3A:
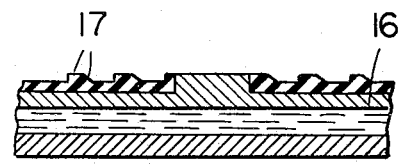
FIG. 3a is a sectional view taken on line 3a—3a of FIG. 3.

After the film layers 11 and 11', now bonded together as described, have advanced pass the nip formed by seal roll 19 with rotating cylinder 16, the laminar structure begins to cool to the temperature of mask 17. Since, as aforenoted, the construction material of mask 17 is a poor conductor of heat, its steady state temperature is very nearly that of the internal coolant, e.g. water, circulating within cylinder 16 as illustrated in FIG. 3a. Take-off roll 21, as illustrated in FIG. 1, provides means for the heat sealed laminar film layer to be removed from the surface of mask 17 at a proper angle which will afford uniform film release from the surface of mask 17 and avoid stretching the heat-sealed film layers which are still fairly hot.

Subsequently, the laminar film product may be positively cooled by passing it around in contact with smooth-surfaced rotating cooling drum 22, as illustrated in FIG. 1, said drum being internally cooled with a circulating fluid coolant, e.g. water, which is not shown.

The embossed laminar film product may now be passed to a wind-up roller for storage or final end-use applications in that form, such as for example packaging material. The product produced in accord with the method and apparatus of the present invention as aforedescribed provides an excellent protective packaging material with cushioning action especially, for example, in the packaging of delicate, easily damaged instruments or other fragile articles. The packaging material of the present invention offers excellent resistance to shock or impact for said articles due to the inherent pneumatic cushioning properties imparted by the encapsulated air present in such packaging materials.

Figure 3:
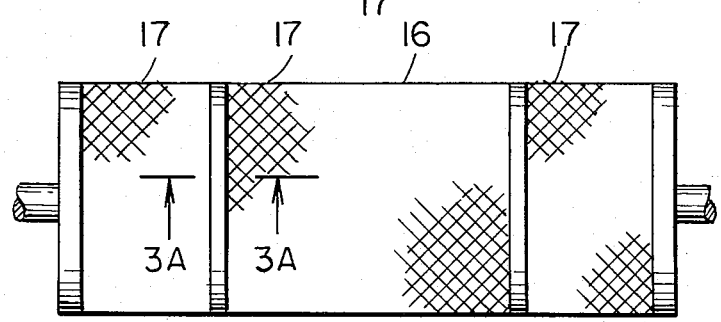
FIG. 3 is a modified form of the patterned surface cylinder illustrated in FIG. 2.

Alternatively, the laminar film product may be further formed into products such as, for example, bags utilizing standard thermoplastic bag-making techniques. Such bags have excellent thermal insulating properties and find wide end-use applications in the refrigeration storage of fresh foods and the like. In order to make bags from the quilted laminar product of the present invention, it is necessary to fold the quilted film and side-seal it together along a longitudinal edge thereof to make a continuous tube which later may be optionally gusseted, cut to the desired bag length, and end-sealed, see FIGS. 5 and 6, for example. In the side-seal operation utilizing the material of the present invention in the production of bags, where the side seal is to be formed by conventional heat sealing means, it has been found desirable to eliminate the embossed portions of the film layers in the area where the side seal is to be made. Although this is not absolutely essential, it has been found in high-speed commercial bag making operations to be desirable in order to insure a positive heat seal between the laminar film layers in this area. Also, in commercial bag making operations, it has been found desirable to initially produce embossed laminar film wide enough so that a plurality of bags may be formed along the length of the side-sealed tube, as is standard practice in, for example two-up bag making operations where two bags are simultaneously formed side by side, for each stroke of the bag forming machine. In order to do this it has been found necessary to slightly modify the surface configuration of mask 17 carried on the surface of rotating cylinder 16, which modification is illustrated in FIG. 3. In this case the mask 17 comprises three separate continuous sections around the surface of cylinder 16, these sections being separated by metallic bands which may be an integral part of cylinder 16. Metallic bands are also located around the circumference along the outside edges of cylinder 16. The outer diameters of these metallic bands correspond to the outer diameter or height of the raised intersecting lines carried on the surface of mask 17. Additionally, the extreme edges of mask 17 are provided with a continuous straight seal line to close in the cavities at the edges of the mask. The metal bands are employed in order to block film layers 11 and 11' together, but not seal them in this area so that in the two-up bag making operation these areas remain smooth and unembossed for the improved reception of side-seals which are subsequently formed along these areas. Blocking of the film layers together is desirable to avoid any air entrapment in this area while sealing the film layers together in this area is undesirable since it would interference with subsequent side-seal operations.

FIGS. 4, 4A and 4B illustrates a part of a tube side-sealing and bag-making operation utilizing the laminar embossed film material produced when employing a mask surface such as that illustrated on the surface of cylinder 16 in FIG. 3. The continuous, double layer, laminar film shown in FIG. 4 is folded about a center line utilizing standard film folding equipment to produce a folded double layer laminar product as illustrated in FIG. 4A. The folded tube shown in FIG. 4A is passed into a conventional side-sealing apparatus whereupon two separate heat-sealed tubes are formed as shown in FIG. 4B. These tubes are subsequently passed to standard bag making equipment, not shown, which forms the tubes, which may be optionally gusseted at this point, into bags, heat sealed along one end thereof and opened at the top. It will be noted from FIGS. 5 through 8 that the bag structures produced from the respective continuous tubes of FIG. 4B in accord with the aforedescribed embodiment, are not identical, i.e. bags formed from the upper tube illustrated in FIG. 4c are characterized by having a narrow margin of unembossed material along both longitudinal edges thereof whereas bags formed from the lower tube of material illustrated in FIG. 4B are characterized as having a fold line through an embossed area constituting one longitudinal edge of the bag and a heat seal line along the opposed longitudinal edge thereof with a narrow unembossed portion adjacent the heat seal line constituting the opposite longitudinal edge of the bag. Thus, the heat seal line or margin along the edge of the bag is in an area of the bag tube which is devoid of the intersecting heat sealed areas.

A wide variety of materials may be employed to produce the quilted laminar film product in accord with the present invention and in particular plastic films. For example, polyolefins such as polyethylene, polypropylene and polybutene, also polyester film such as polyethylene terephthalate or polystyrene sheet material. The foregoing are just a few examples of the wide variety of materials which may be used to produce the novel products as described herein. In the following example polyethylene film, a particularly preferred material, is employed in the process of the present invention to produce the laminar quilted film product. The example is merely for purposes of illustration and to describe a particular embodiment of the present process and accordingly should not be construed as limiting the scope of the present invention.

EXAMPLE 1

Two continuous layers of polyethylene film each having an approximate gauge of 0.7 mil were fed, at line speeds of approximately 100 ft/min., through a pair of idler nip rollers 12. After passing through the idler nip, the lower film layer was then passed around and under idler roll 13 and over the top of spreader bar 14 and into the nip formed by quilt roll 15 with embossing cylinder 16. Intermediate the idler roll and quilt roll an infrared emitting, 5,000 Watt, quartz type lamp preheated the film by reflected radiation from black surfaced plate 9', positioned immediately below the film at this point. The film temperature, as it is impressed into the recesses of the embossing mask carried on the surface of cylinder 16 by quilt roll 15, is approximately 150°F. The surface of quilt roll 15 is covered with a coating, approximately one-eighth inch thick of a firm density silicone rubber sponge. The surface of cylinder 16 is covered with a molded rubber embossing sleeve adhesively secured thereto. The surface of the embossed pattern consists of raised intersecting lines which lines intersect to form diamond shaped cavities one-fourth inch square and approximately 30 mils deep, the intersecting lines being approximately 0.04 inch wide. By virtue of the rotation of cylinder 16 rotating in a clockwise direction, the film, supported by the rubber embossing mask, is carried past radiant heat source 18 which comprises a bank of two infrared lamps, as aforediscussed, which serve to heat the surface of embossing mask to a temperature of about 300°F, causing those areas of the film in contact with the maks, i.e. those areas supported by the raised intersecting lines, to be heated to the vicinity of slightly below the melting point of the film.

The second or upper layer of film, after passing through idler nips rolls 12, as previously described, is passed over a water cooled pipe, between radiant heat source 18 and rotating cylinder 16, and finally over a water-cooled spreader bar to the nip formed between sealer roll 19 and cylinder 16, as illustrated in FIG. 1. The upper layer of film is heated by contact with the heated seal roll to a temperature of about 275°F. As the two layers of film are nipped together at this point they are simultaneously sealed together, in an area corresponding to the pattern formed by the raised intersecting lines on the surface of the embossing mask. The embossed laminar film is then stripped from the surface of cylinder 16 and passed around an internally cooled chill-drum to lower the temperature thereof so that it may be passed to a wind-up roller for storage or on to further fabricating, for example such as a bag making operation as aforedescribed.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for the production of a laminar thermoplastic film structure which comprises supplying a length of a first thermoplastic film onto an embossed, raised, patterned surface of a cylindrical moving support, said raised, patterned surface being infrared absorbent, said patterned surface comprising a plurality of spaced-apart, continuous raised patterns circumscribing the periphery of said moving support, said raised pattern surface being interrupted by unpatterned circumferential bands, impressing said film against the surface of said moving support by nipping said film between said support and a counterrotating resilient surfaced roller to produce in said film a pattern corresponding to the embossed coated surface of said moving support, heating the raised portion of the embossed coated surface of said moving support supporting said film and maintaining the circumferential bands at a relatively cool temperature, supplying a second length of preheated thermoplastic film into superposed relationship with the first film supported by said moving support, said second film being impressed against said first film by the action of a roller rotating counter-current to and in nipping engagement with both the raised, patterned surface and the areas of said support intermediate said spaced-apart, raised, patterned surface portions to thereby heat-seal said preheated second film to the portions of said first film in contact with the raised portions of the embossed surface by applying pressure to said second film in contact with said first film while said first film is supported by said support surface, and thereafter withdrawing the resulting laminar thermoplastic film from said support, a laminar characterized by longitudinal portions free of heat sealing corresponding to the areas of contact with the relatively cooled circumferential bands.

2. A method in accordance with claim 1 wherein after said laminar thermoplastic film is withdrawn from said support said laminar thermoplastic structure is cooled by bringing it into contact with the surface of a cooled rotating cylinder.

3. A method in accordance with claim 1 wherein said embossed surface comprises a molded rubber sleeve secured to the surface of said moving support.

4. A method in accordance with claim 1 wherein said embossed surface is heated by exposure thereof to infrared radiation.

5. In a process for manufacture of bags of embossed thermoplastic film laminate by passing two layers of thermoplastic onto a roller having a raised pattern surface, applying heat to said raised pattern surface to thereby heat seal the layers together in a pattern corresponding to that of said raised pattern service, placing two of said laminates in contact with each other, slitting, edge sealing and end sealing to form bags therefrom;

the improvement which comprises passing said layers onto a roller having raised pattern surfaces interrupted by unpatterned circumferential bands, applying heat to said raised pattern surfaces, cooling said circumferential bands, whereby the laminate is characterized by longitudinal portions free of heat sealed patterns and performing said slitting and edge sealing in said longitudinal portions.

* * * * *

UNITED STATES PATENT OFFICE
CERTIFICATE OF CORRECTION

Patent No. 3,904,465　　　　　　　　Dated September 9, 1975

Inventor(s) Donald A. Haase and Robert E. Reed

It is certified that error appears in the above-identified patent and that said Letters Patent are hereby corrected as shown below:

Column 3, line 29, cancel "heated radiation" and insert --heat radiation--.

Column 8, line 4, cancel "a laminar characterized" and insert --a laminar film characterized--.

Signed and Sealed this

Third Day of August 1976

[SEAL]

Attest:

RUTH C. MASON
*Attesting Officer*

C. MARSHALL DANN
*Commissioner of Patents and Trademarks*